INVENTORS
DONALD E. EMHISER and
GEORGE A. PECORARO

BY
ATTORNEYS

INVENTORS
DONALD E. EMHISER
and GEORGE A. PECORARO
ATTORNEYS

United States Patent Office 3,450,516
Patented June 17, 1969

3,450,516
PROCESS FOR MELTING GLASSMAKING INGREDIENTS ON A MOLTEN METAL BATH
Donald E. Emhiser, Natrona Heights, and George A. Pecoraro, New Kensington, Pa., assignors to PPG Industries, Inc., Pittsburgh, Pa., a corporation of Pennsylvania
Filed Oct. 19, 1965, Ser. No. 498,055
Int. Cl. C03c 21/00, 17/00
U.S. Cl. 65—99                           3 Claims

ABSTRACT OF THE DISCLOSURE

Glassmaking ingredients which melt at different rates are fed as a relatively thin blanket onto molten metal and are melted thereon to form a ribbon of glass.

---

Figure 1:
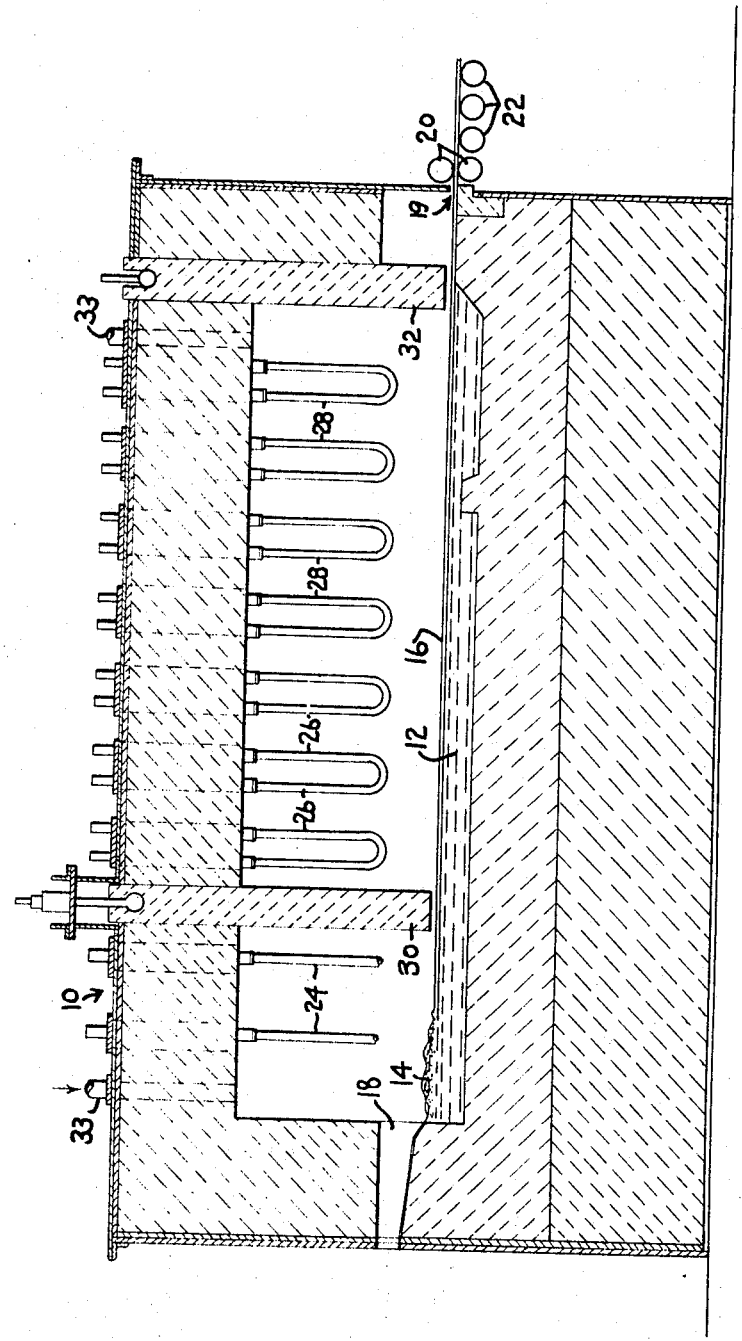

This invention relates to melting glassmaking materials and especially to a novel process for continuously or substantially continuously melting glassmaking materials on a body of a liquid more dense than the materials, such as molten tin or the like.

In the usual continuous process for melting glass, glassmaking materials, such as sand and perhaps cullet, in correct and measured proportions, are fed into the feeding doghouse of a glassmaking tank, usually having a capacity of eight (8) to ten (10) times the daily output of the tank wherein the materials are melted, the resulting glass is refined and then flows to the working end of the tank for delivery from the tank.

A description of a plate glass tank has been stated as follows:

When the fires are first lighted at the beginning of a campaign the temperature of the tank is elevated gradually over a period of about three weeks until all of the tank and furnace lining materials become thoroughly heat soaked and its contents melted. The mixed batch of raw materials is then fed almost continuously into the melting end of the tank, called the filling doghouse, and is pushed automatically ino the roaring interior of the white-hot tank where temperatures range from 2830° F. to 2865° F., and higher.

Melting is accomplished almost entirely by surface heat, and flaming gas spouting from the side wall ports, first from one side and then from the other, being reversed periodically. The crown of the furnace radiates directly down into the glass batch, and the fires tend both to heat the crown and the surface of the glass batch. The batch is very much lighter than the molten glass and floats on the surface, either in large lumps, where intermittent feeding is practiced, or as a blanket over the whole melting area.

By common consent the area of the molten glass is arbitrarily divided into the melting zone, the fining zone, and the working zone. No actual demarcation exists between these areas, except as temperature differences exist. In the melting zone, the lumps of batch float in a mass of foam produced by their own melting and the mass of boiling glass about and below them. The foaming is most violent about half way through the melting zone, where the temperatures are highest. The lumps are moved about by hand-operated hooks to keep the largest (least melted) ones near the hotter part of the fires, and as they melt, they become smaller and move slowly down the furnace. By the time they come opposite the fourth port, they are really only a mass of foam or froth. The fires from the fifth—and if necessary sixth—port are hot enough to reduce the viscosity of the molten mass to a point where the foam bubbles burst easily and rapidly, and thereby a foam line is established beyond which no foam is apparent.

Here begins the fining zone, where the glass is quiescent and any small bubbles of gas within the glass have an opportunity to rise to the surface and burst. In some respects this process is much the same as the gathering of cream on a pan of milk. Since no heat is introduced into the furnace in the fining zone, all the heat available must come from the metal molten glass itself and from some radiation from the melting zone. Consequently, the temperature of the glass fall steadily and progressively as it moves toward the working zone. Even when no glass is being drawn from the tank, there is a constant flow of glass from the melting zone to the working zone, on the surface and in the reverse direction, along the bottom. Also the glass flows toward the side walls on the surface and toward the center, along the bottom. These convection currents tend to carry dross (scum) to the side walls and thence back into the melting zone, where ultimately the dross (scum) is finally melted and assimilated into the glass. Tests have indicated that it requires about 8 hours from the time raw hatch is filled into the filling end until it is rolled out as a sheet of rough plate glass at the working end of the tank, which it leaves at about 2100° F.

From the above description, it can be understood that the melting tank is a large piece of equipment, especially in a plate, sheet or float line. Some commercial tanks are capable of delivering 100 to 300 tons of glass or more per day, so that the capacity of such tanks is on the order of 2,000 or more tons of glass. The glass in a tank must be kept in working condition for the campaign, which may be as long as four (4) years or more. Thus a large quantity of glass must be kept in working, molten condition for a long period of time—a costly process when it is known that the efficiency of a conventional tank rarely exceeds 20 percent. Because of the size of usual glass making tanks, such tanks contain many tons of refractory material in their construction. They are costly, not only to operate, but also to build, and glass contact refractories limit their life.

In the conventional melting of the glassmaking materials, which as previously stated, contain silica, various oxides and perhaps a quantity of cullet (generally on the order of 25 percent of the total batch), there are different rates of melting or fusion for the different ingredients. Sand is usually the most difficult ingredient to melt, accounting for the time factor between batch and glass, as mentioned above. And because of contact with refractories and the refractory wash, incremental portions of the resultant glass may vary slightly in composition.

There are other problems encountered when operating a conventional melting tank. For example, from time to time a product change may be required, i.e., a change from clear glass to coloured glass. To accomplish such a change, it is necessary to add sufficient colorant to modify the entire mass of glass in the tank and generally several days is required for such change. Refractory wash, i.e., refractory ingredients being dissolved by the molten glass and becoming part of the glass, besides causing variances in composition, leads to the inclusion of stones, i.e., large refractory particles, in the glass, which results in reject quality product and may be difficult to correct.

These and other drawbacks of conventional tank melting techniques have been successfully overcome by melting glassmaking materials on a support, such as a bath of molten liquid having a density greater than the density of the glass and of the glassmaking materials. An example of a supporting liquid is molten tin, although the present invention is not so limited.

Basically, the method of the invention being described for melting glassmaking ingredients operates on a plug flow principle. In this invention, there is a complete absence of natural convection currents which are present in the previously described conventional process where a large quantity of molten glass is stored in a tank. When using the present invention, the natural flow from glassmaking ingredients to molten glass to delivery of molten glass is undisturbed.

This is accomplished by supporting a relatively thin layer of glassmaking ingredients, melting the supported ingredients, and continuing to support the resultant glass which is then removed from the support.

In the preferred embodiment of the process of this invention a relatively thin layer of glassmaking materials is substantially uniformly fed onto the surface of a bath of molten tin contained within an enclosure. The tin may be a minimum of one to two inches deep. The enclosure in which the bath of tin is contained, generally a refractory, such as clay is heated by any conventional means, as for example overhead, electrically energized heating elements. Heat is thus supplied to the top of the layer of materials by the heating elements and by conduction from the molten tin to the bottom of the layer of materials, so as to melt and refine the resultant glass. The thermal efficiency of such a process is greater than that of the conventional tank melting process and the size of the necessary equipment is much less, because it has been found that the materials can be melted and refined in a much shorter lentgh of time as for example, on the order of one hour, i.e., about one-eighth the time required for the same phenomena in a conventional tank. Because of this, there is a high tonnage output to total tank capacity, and a more efficient melting procedure is provided.

Because there is a relatively thin blanket of glassmaking materials being processed at one time, there is no large quantity of glass being retained in a refractory tank. There is a material reduction in refractories in contact with the glass and less opportunity for refractory materials to be dissolved in the resultant glass. In the event the glassmaking materials do not entirely cover the molten liquid, there can be little or no contact with refractories. Actually wetting or non-wetting refractories can be used.

A product change is rapidly accomplished by the addition of a different material to the glassmaking ingredients. The composition of a large quantity of glass, such as that stored in a conventional glass melting tank, need not be modified.

As can readily be understood, a relatively thin blanket of glassmaking materials can be rapidly melted and refined and the resultant molten glass in the general form of a ribbon of glass can be advanced into a forming unit for manufacturing a flat glass product. For example, if the forming unit is a float glass producing unit, the molten galss blanket can be advanced along a bath of molten tin where it will seek its equilibrium thickness of approximately one-fourth inch if permitted to flow unhindered in the absence of processing to reduce or increase the normal equilibrium thickness, or the ribbon may be processed according to the teachings of Edmund R. Michalik in his copending United States application for Letters Patent, Ser. No. 251,682, filed Jan. 15, 1963, now Patent 3,241,939 in which the equilibrium thickness is modified.

Figure 2A:
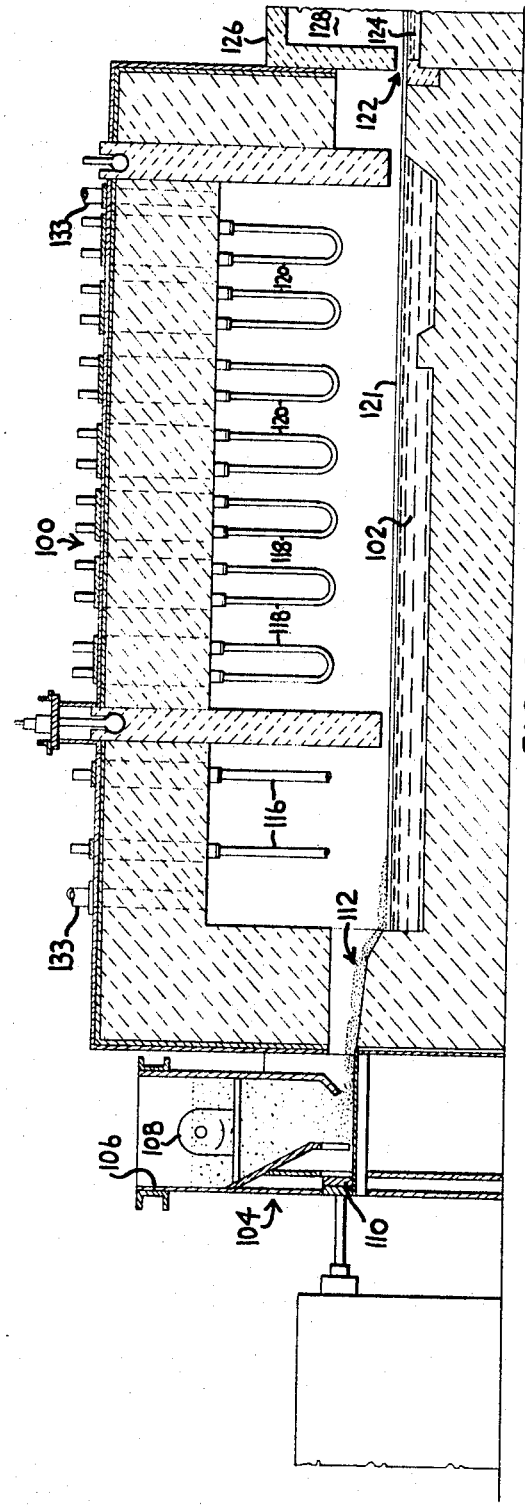
Figure 2B:
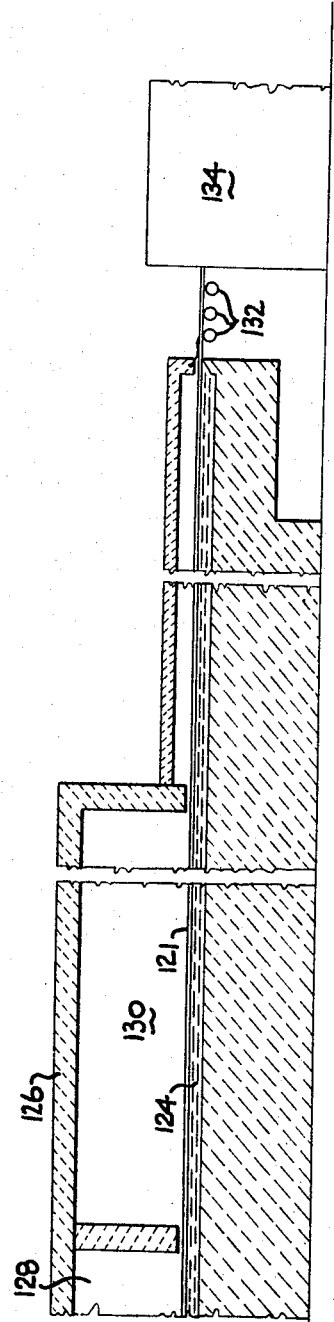

These and other features of the invention will become apparent from the following description, when taken with the accompanying drawings, in which:

FIG. 1 is a longitudinal section through a typical melting unit utilizing the principles of this invention; and FIGS. 2A and 2B are longitudinal sections through a float glass producing unit utilizing the principles of this invention.

Turning now to FIG. 1, there is shown a melting container or melter generally identified as 10, which contains a bath of molten tin 12 onto which is fed a substantially continuous mass or banket of glassmaking ingredients 14 which melts thereon to become a ribbon-like body of molten glass 16. The glassmaking ingredients are fed onto the tin through an opening 18 of what might be referred to as a feeding doghouse and by means such as a conventional batch feeder (not shown in FIG. 1) but similar to that described and claimed in Halbach et al., United States Patent No. 2,327,887. The ribbon-like body of molten glass advances along the bath of tin and discharges from the melter 10 through a discharge opening 19, being sized to thickness by a pair of conventional forming rolls 20 disposed at the exit end of the melter. The rolled glass is conveyed by rollers 22 into an annealing lehr (not shown in FIG. 1) in a conventional manner.

The melter is constructively divided into three sections, i.e., a melting section, a refining section and a conditioning section. The divisions are mainly accomplished by the quantity of heat applied to the glassy materials. To apply heat, there are heaters 24, heaters 26 and heaters 28 in the melting, refining and conditioning section respectively. Each heater may be identical in construction and may comprise an electrically energized unit, suitably connected to a source of power. To regulate the degree of heating, suitable rheostats are used. Electrical heater and controls are conventional and require no additional description.

To further separate the melting section from the refining section, a refractory gate 30 may be used. The gate 30 extends from side-to-side in the melter and is adjustable in vertical position. Generally, the gate 30 is used to maintain the desired temperature relationship between the melting section and the refining section. A gate 32 extends from side-to-side in the melter and is adjustable vertically. Generally the gate 32 is used only at start-up when the melter is being preheated to operate temperature to seal it off so that incoming atmosphere does not oxidize the supporting liquid.

In operation, a melter 10 having a length of 77 inches and a width of 38 inches was preheated with a portable gas heater extending into the opening 18 to a temperature of approximately 1300° F., after which the heaters 24 were energized to heat the melter to a temperature of approximately 2550° F. The heaters 26 and 28 were also energized to raise the temperature of the refiner and conditioner sections to 2720° F. Before introducing the tin of the bath into the melter, the interior of the melter was purged with nitrogen and thereafter forming gas was introduced through an opening adjacent the feeding doghouse and through an opening in the roof adjacent to the gate 32, the openings being identified at 33, into the melter. The forming gas contained approximately 5.5 percent $H_2$ and 94.5 percent $N_2$. The gas provided a reducing atmosphere which prevented oxidation of the tin bath before glass materials were melted thereon. After a pressure slightly above atmospheric, i.e., on the order of 0.03 inch $H_2O$, was established, molten tin was introduced into the melter until a predetermined level of approximately 2 inches was established. Thereafter, glass making materials comprising sand, soda ash, limestone, magnesium carbonate, etc., in their proper proportions, were continuously introduced into the melter as a layer approximately two inches in thickness. After an initial period of time, on the order of 60 minutes, sufficient for the initial glass to melt, refine and move to the exit end of the melter, glass in ribbon form was rolled.

Surprisingly, after the initial introduction of the tin and the melting of the glass making materials thereon, a protective atmosphere was not required. Because of this finding, natural gas heating can be substituted for the electric heating described.

It was also surprising that the glass produced did not contain a large amount of tin or a tin oxide, although it was first expected to do so. Glass was produced under neutral, reducing and oxidizing conditions to determine the amount of tin or a tin oxide contained therein. It was found that the quantity of tin in glass produced under these various conditions did not vary appreciably, being on the order of 0.03 percent or less. Moreover, various glass compositions and types of ingredients were melted and it was found that the amount of tin in the glass produced was substantially the same, indicating that the type of glass making ingredients, i.e., composition or otherwise, does not affect the process.

Attention is now directed to FIGS. 2A and 2B which, when placed together, illustrate an integrated float glass producing system utilizing the present invention. Heretofore, the conventional melting tank of large capacity has been used in the float glass process; however, here the melter utilizing a liquid support is used in lieu of the large melting tanks.

Here we see a melter, generally identified by the reference number 100 which is substantially like that illustrated in FIG. 1. Batch materials are fed onto the tin bath 102 in the melter 100 by means of a batch feeder 104 which includes a hopper 106, a screw 108 in the hopper, so as to prevent agglomeration of the batch (because generally batch contains a finite quantity of water) and a pusher 110 which feeds a blanket of the batch indicated at 112 through the feeding doghouse 114 onto the surface of the tin 102. The pusher 110 is operated to feed a substantially continuous blanket of the batch onto the tin. In order to melt, refine and condition the glass, heaters 116, 118 and 120, in the melting refining and conditioning sections of the melter are provided. While these heaters are shown to be electrically energized, it is to be understood that other types of heating may be used. The molten glass 121 in ribbon form advances along the tin bath of the melter and discharges through the exit 122 onto a bath of molten tin 124 in a float glass producing tank 126. While the tin baths 102 and 124 are shown as being separate, they may be the same without departing from the spirit of the invention. In the first section 128 of the tank 126, the glass is maintained in molten condition and may, in the absence of other working as described in the aforesaid Michalik et al. application, seek its equilibrium thickness and become level and smooth. In the second section 130 of the tank 126, the glass is gradually cooled, so as to be removable without damage to its surfaces which are fire-finished or similar to fire-finished. Thereafter, the finished ribbon of glass is removed by exit rolls 132 and conveyed into an annealing lehr 134 of conventional construction and operation for removing stress and strain therefrom. It is desirable and generally necessary to supply a gas, similar to the forming gas previously described, to the interior of the tank 126 to prevent oxidation of the tin of the bath 124. Generally this is necessary because the tank 126 is usually wider than the width of the ribbon avoiding glass-refractory contact and narrow edge portions of the tin are exposed to the atmosphere within the tank. Inlets 133 are provided for the introduction of the gas into the interior of the melter.

In the embodiments described, the support has been identified as molten tin. It is to be understood that other supporting media can be used in the practice of this invention. When molten liquids are used, it is important that the liquid and the glassmaking ingredients be substantially non-reactive with each other and that little, if any, supporting liquid be assimilated within the glass. For example, molten gold and silver may be used instead of the molten tin.

We claim:
1. A method of manufacturing glass which comprises:
   continuously delivering a mixture of raw glassmaking ingredients which melt at different rates to form a relatively thin layer of said mixture on the surface of a bath of molten metal to float said ingredients thereon,
   applying heat to said floating raw glassmaking ingredients to melt all of said raw ingredients,
   continuing to heat the molten raw ingredients of said mixture at a temperature and for a period of time sufficient to cause said raw ingredients to react to form molten glass and to refine the resultant glass while in contact with said molten metal,
   forming a ribbon of glass on said molten metal bath, and
   delivering said ribbon of glass from said bath, which ribbon contains a relatively small amount of the metal of said bath.
2. A method as recited in claim 1 in which said molten metal is tin.
3. A method as recited in claim 1 in which said raw glassmaking ingredients include sand, soda ash, limestone and magnesium carbonate.

References Cited

UNITED STATES PATENTS 3,337,323    8/1967    Loukes et al. _____ 65—65
3,140,164    7/1964    Long.
3,288,584    11/1966    Long.

DONALL H. SYLVESTER, *Primary Examiner.*

E. R. FREEDMAN, *Assistant Examiner.*

U.S. Cl. X.R.

65—65